US011735185B2

(12) United States Patent
Chen et al.

(10) Patent No.: US 11,735,185 B2
(45) Date of Patent: Aug. 22, 2023

(54) CAPTION SERVICE SYSTEM FOR REMOTE SPEECH RECOGNITION

(71) Applicant: National Yang Ming Chiao Tung University, Hsinchu (TW)

(72) Inventors: Sin Horng Chen, Hsinchu (TW); Yuan Fu Liao, Hsinchu (TW); Yih Ru Wang, Hsinchu (TW); Shaw Hwa Hwang, Hsinchu (TW); Bing Chih Yao, Hsinchu (TW); Cheng Yu Yeh, Hsinchu (TW); You Shuo Chen, Hsinchu (TW); Yao Hsing Chung, Hsinchu (TW); Yen Chun Huang, Hsinchu (TW); Chi Jung Huang, Hsinchu (TW); Li Te Shen, Hsinchu (TW); Ning Yun Ku, Hsinchu (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 169 days.

(21) Appl. No.: 17/406,132

(22) Filed: Aug. 19, 2021

(65) Prior Publication Data

US 2023/0055924 A1   Feb. 23, 2023

(51) Int. Cl.
*G10L 15/26* (2006.01)
*H04N 21/488* (2011.01)
*H04N 21/2187* (2011.01)
*H04L 65/65* (2022.01)

(52) U.S. Cl.
CPC ......... *G10L 15/26* (2013.01); *H04N 21/2187* (2013.01); *H04N 21/4884* (2013.01); *H04L 65/65* (2022.05)

(58) Field of Classification Search
None
See application file for complete search history.

(56) References Cited

U.S. PATENT DOCUMENTS

| 6,856,960 B1* | 2/2005 | Dragosh | H04M 3/4936 704/E15.047 |
| 8,209,184 B1* | 6/2012 | Dragosh | G10L 13/00 704/270.1 |
| 11,069,368 B2 | 7/2021 | Lipman | |
| 2006/0122836 A1* | 6/2006 | Cross | G10L 15/30 704/E15.047 |
| 2017/0069311 A1* | 3/2017 | Grost | G10L 15/26 |
| 2018/0233135 A1* | 8/2018 | Talwar | G10L 15/063 |
| 2020/0013388 A1* | 1/2020 | Lee | G10L 13/02 |

(Continued)

*Primary Examiner* — Quang N Nguyen
(74) *Attorney, Agent, or Firm* — Bacon & Thomas, PLLC

(57) ABSTRACT

The present invention provides a caption service system for remote speech recognition, which provides caption service for the hearing impaired. This system includes a speaker and a live broadcast equipment at A, a listener-typist and a computer at B, a hearing impaired and a live screen at C, and an automatic speech recognition (ASR) caption server at D. Connect the live broadcast equipment, the computer, the live screen and the ASR caption server with a network. The speaker's audio is sent to the automatic speech recognition (ASR) caption server to be converted into text, which is corrected by the listener-typist, and then the text caption is sent to the live screen of the hearing impaired together with the speaker's video and audio, so that the hearing impaired can see the text caption spoken by the speaker.

9 Claims, 6 Drawing Sheets

(56) References Cited

U.S. PATENT DOCUMENTS

2021/0314523 A1\* 10/2021 Kamisetty ........... H04L 65/1069
2022/0103683 A1\* 3/2022 Engelke ............ H04M 1/72433
2022/0366904 A1\* 11/2022 Martinson ............... G10L 15/30

\* cited by examiner

CAPTION SERVICE SYSTEM FOR REMOTE SPEECH RECOGNITION

FIELD OF THE INVENTION

The present invention relates to a caption service system for remote speech recognition, and more particularly of using a caption server and a listener-typist to provide caption service system for remote speech recognition for the hearing impaired.

BACKGROUND OF THE INVENTION

Because of the COVID-19 outbreak, remote live broadcasting and teaching have become a widely adopted trend. However, the current general remote live broadcasting and teaching do not have captions, so it is impossible for students with hearing impairment to attend classes.

In ordinary classrooms, hearing impaired students also have problems in class, because there is no monitor to directly display the captions of the teacher's lecture content. In various presentations and conferences, the hearing impaired cannot participate because there is no monitor to directly display captions.

Therefore, setting up captions for the hearing impaired that can show what the teacher or speaker says is a great boon for the hearing impaired.

Nowadays, some conferences use a listener-typist to type the content of the speaker with the computer on the spot and display it on the computer screen as captions, so that the hearing impaired can understand the situation on the spot. However, the listener-typist spends a lot of energy listening to the content of the speaker. Once the working hours are too long, there may be missed sentences and typos. Therefore, a more complete remote listener-typist solution must be provided.

SUMMARY OF THE INVENTION

The object of the present invention is to provide a caption service system for remote speech recognition, to provide caption service for the hearing impaired with a caption service for remote speech recognition. The contents of the present invention are described as below.

This system includes a speaker and a live broadcast equipment at A, a listener-typist and a computer at B, a hearing impaired and a live screen at C, and an automatic speech recognition (ASR) caption server at D. Connect the live broadcast equipment, the computer, the live screen and the ASR caption server with a network.

The automatic speech recognition (ASR) caption server includes: a real time messaging protocol (RTMP) to receive the live stream from A through the network; an open source speech recognition toolkit for speech recognition and signal processing; a web server is responsible for providing the interface of the web page, which is transmitted to the live broadcast equipment, the computer and the live screen through the HTTP protocol; a recording module is used for the playback function of the listener-typist.

The audio of the speaker is sent to the ASR caption server to be converted into text, the text is corrected by the listener-typist. and then the text caption is sent to the live screen of the hearing impaired together with the speaker's video and audio, so that the hearing impaired can see the text caption spoken by the speaker.

DETAILED DESCRIPTIONS OF THE PREFERRED EMBODIMENTS

Figure 1:
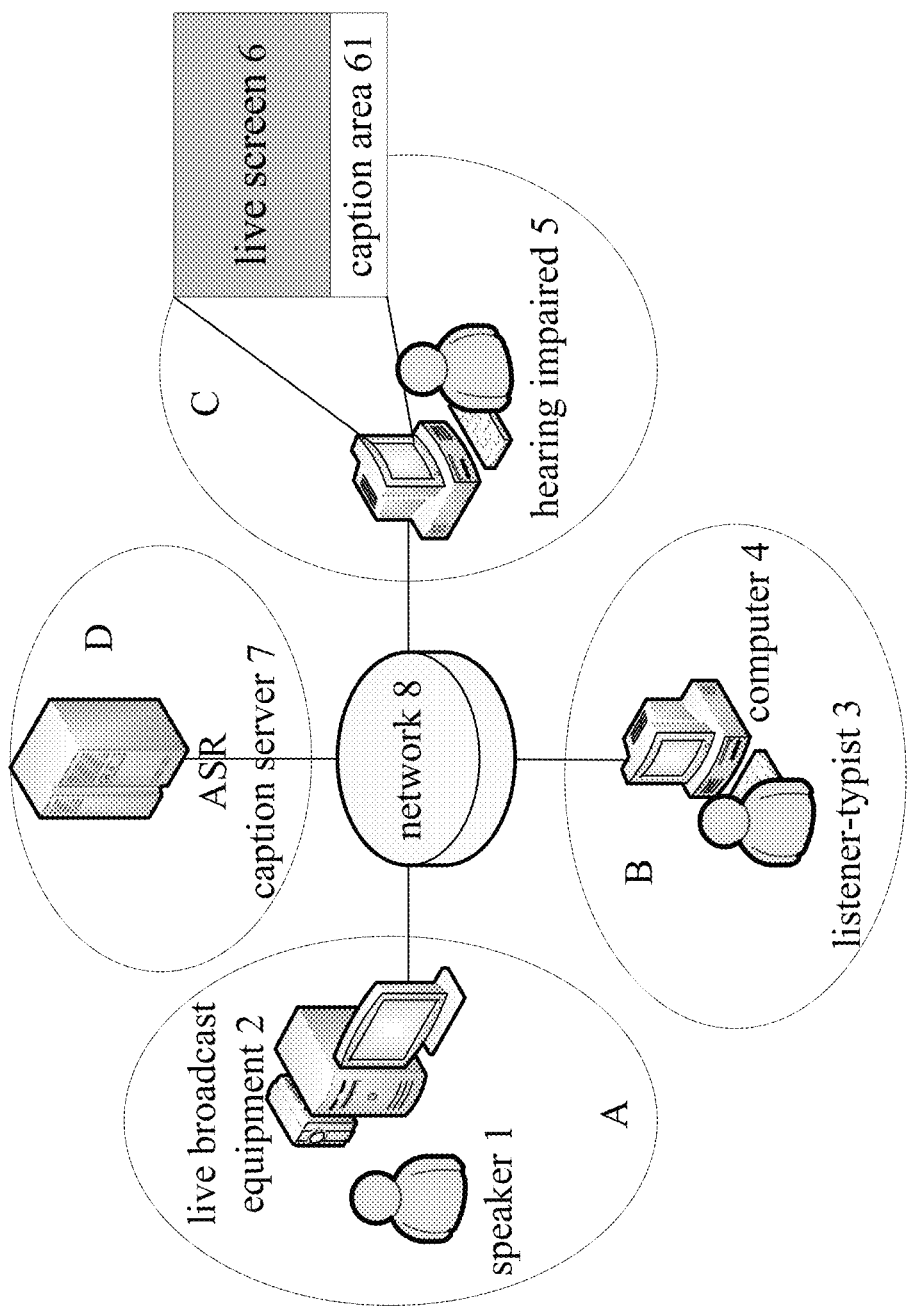
FIG. 1 shows schematically the basic structure of the caption service system for remote speech recognition according to the present invention.

FIG. 1 describes the basic structure of the caption service system for remote speech recognition according to the present invention. The speaker 1 and the live broadcast equipment 2 at A, the listener-typist 3 and the computer 4 at B, the hearing impaired 5 and the live screen 6 at C, the automatic speech recognition (ASR) caption server 7 at D. Connect the live broadcast equipment 2, the computer 4, the live screen 6 and the ASR caption server 7 with a network 8. The network 8 can be a local area network or an Internet. If A, B, C are at the same place, then the speaker 1, the listener-typist 3 and the hearing impaired 5 are at the same classroom or conference room.

Figure 2:
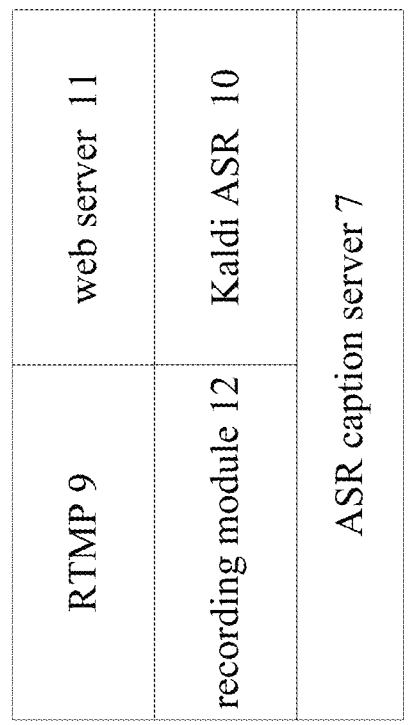
FIG. 2 shows schematically the contents of the automatic speech recognition (ASR) caption server according to the present invention.

FIG. 2 describes the contents of the automatic speech recognition (ASR) caption server according to the present invention. Real-Time Messaging Protocol (RTMP) is a protocol used widely in live streaming. The ASR caption server 7 uses the RTMP protocol to receive the live streaming from A through the network 8. The RTMP can be replaced by the HTTP Live Streaming (HLS), which is based on HTTP Streaming Media Network Transmission Protocol provided by the Apple Company. However, the present invention is not limited to RTMP or HLS.

The ASR caption server 7 uses an open source speech recognition toolkit Kaldi ASR 10 for speech recognition and signal processing, which can be obtained freely under Apache License v2.0.

The ASR caption server 7 has to be equipped with a web server 11, which is an interface for providing the web and for being delivered to clients through HTTP (web browser). The clients mean the live broadcast equipment 2, the computer 4 and the live screen 6.

The ASR caption server 7 has a recording module 12 for being used by the listener-typist to conduct a replay function.

Figure 3:
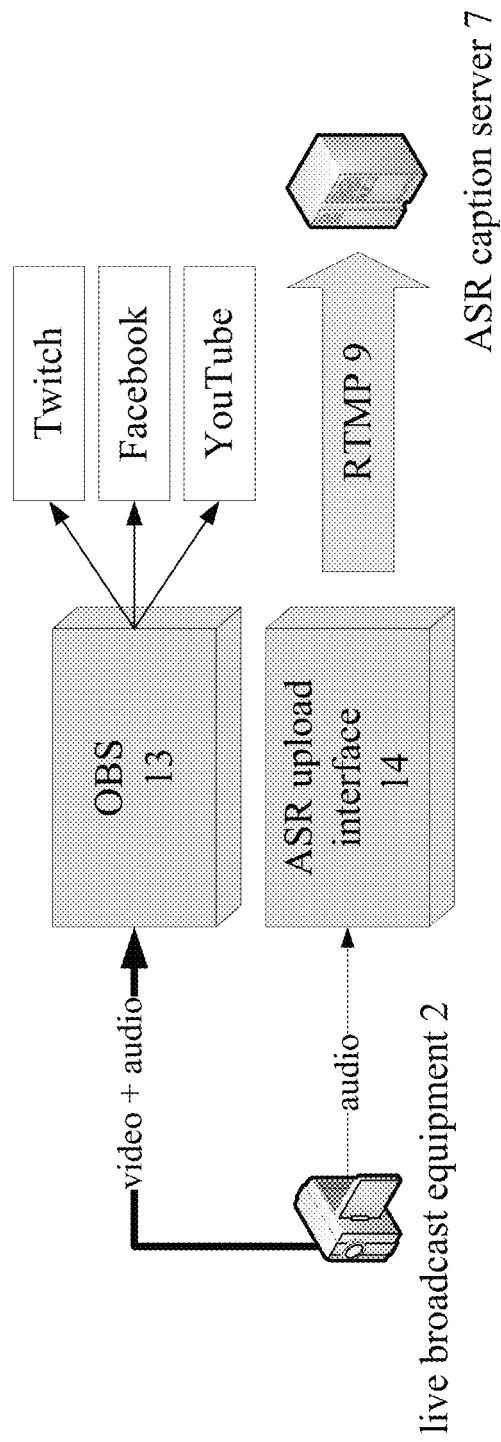
FIG. 3 shows schematically the contents of the live broadcast equipment according to the present invention.

Referring to FIG. 3, the content of the live broadcast equipment 2 is described. The live broadcast equipment 2 of the speaker 1 at A records the video and audio of the speaker 1 for splitting into two paths. The first path including video and audio is inputted into Open Broadcaster Software (OBS) 13 developped by the OBS Project for being a free and open source cross-platform streaming media and recording program, and is the software usually used by live broadcasters. The output of the OBS 13 is directly inputted into platforms such as YouTube, Facebook or Twitch, etc.

The second path including only the audio of the speakser 1 is inputted into the ASR uploading interface 14 for packeting the audio, and then passing through the RTMP 9 (or HLS) for live streaming to the ASR caption server 7.

Figure 4:
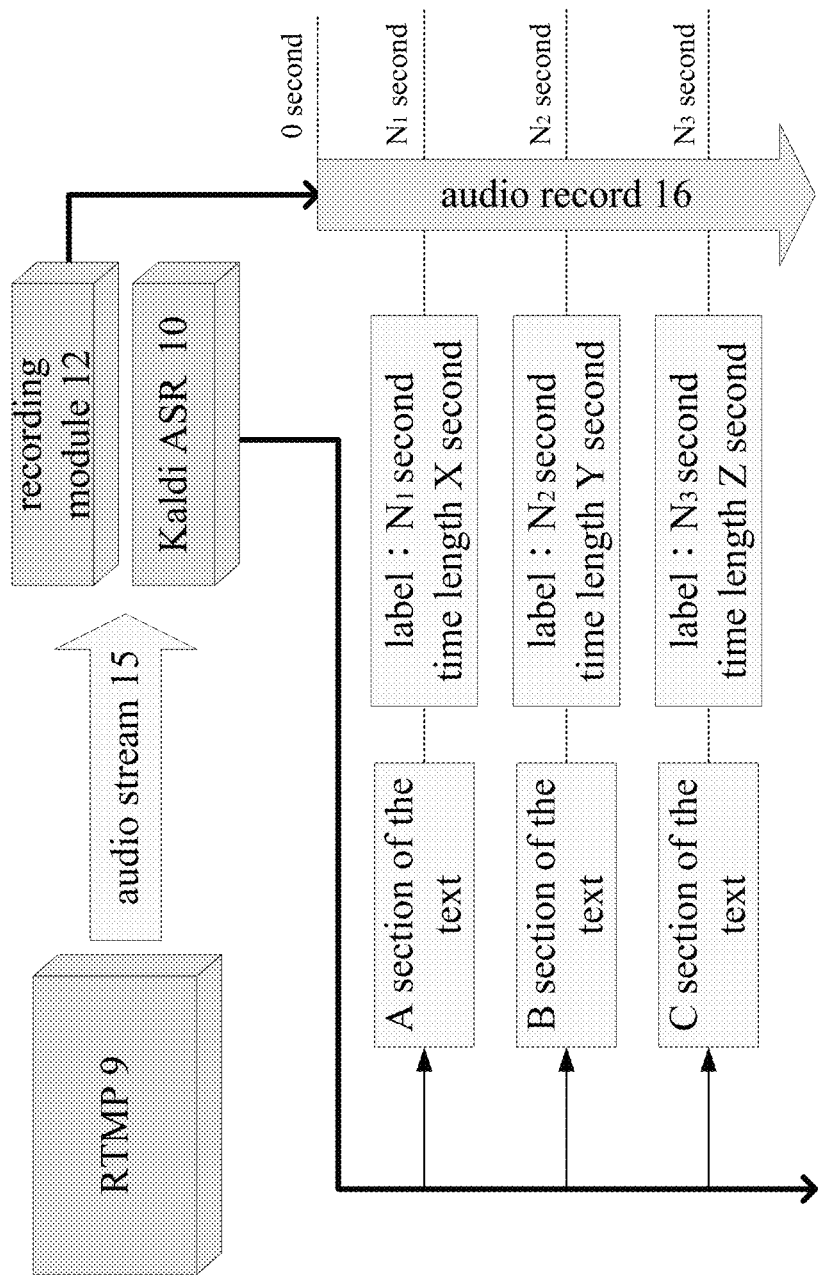
FIG. 4 shows schematically the procedures to generate the caption by the automatic speech recognition (ASR) caption server according to the present invention.

Referring to FIG. 4, the caption generating process of the ASR caption server 7 according to the present invention is described. When the streaming packet is inputted into the RTMP 9 (or HLS) of the ASR caption server 7, the streaming packet will be de-packeted to an audio streaming 15, and inputted into the Kaldi ASR 10 and a recording module 12 respectively. The recording module 12 will record the audio streaming 15 into an audio record 16 based on the time. When the Kaldi ASR 10 receives the audio streaming 15, the audio streaming 15 will be converted into text. Each section of the text will be added with a label as shown in FIG. 4. The label will describe what second of the audio record 16 that the section of the text is corresponding to, and how long it is. These texts and labels thereof will be shown on the web page of the web server 11 for being sent to the live broadcast equipment 2, the computer 4 and the live screen 6 through the network 8.

Figure 5:
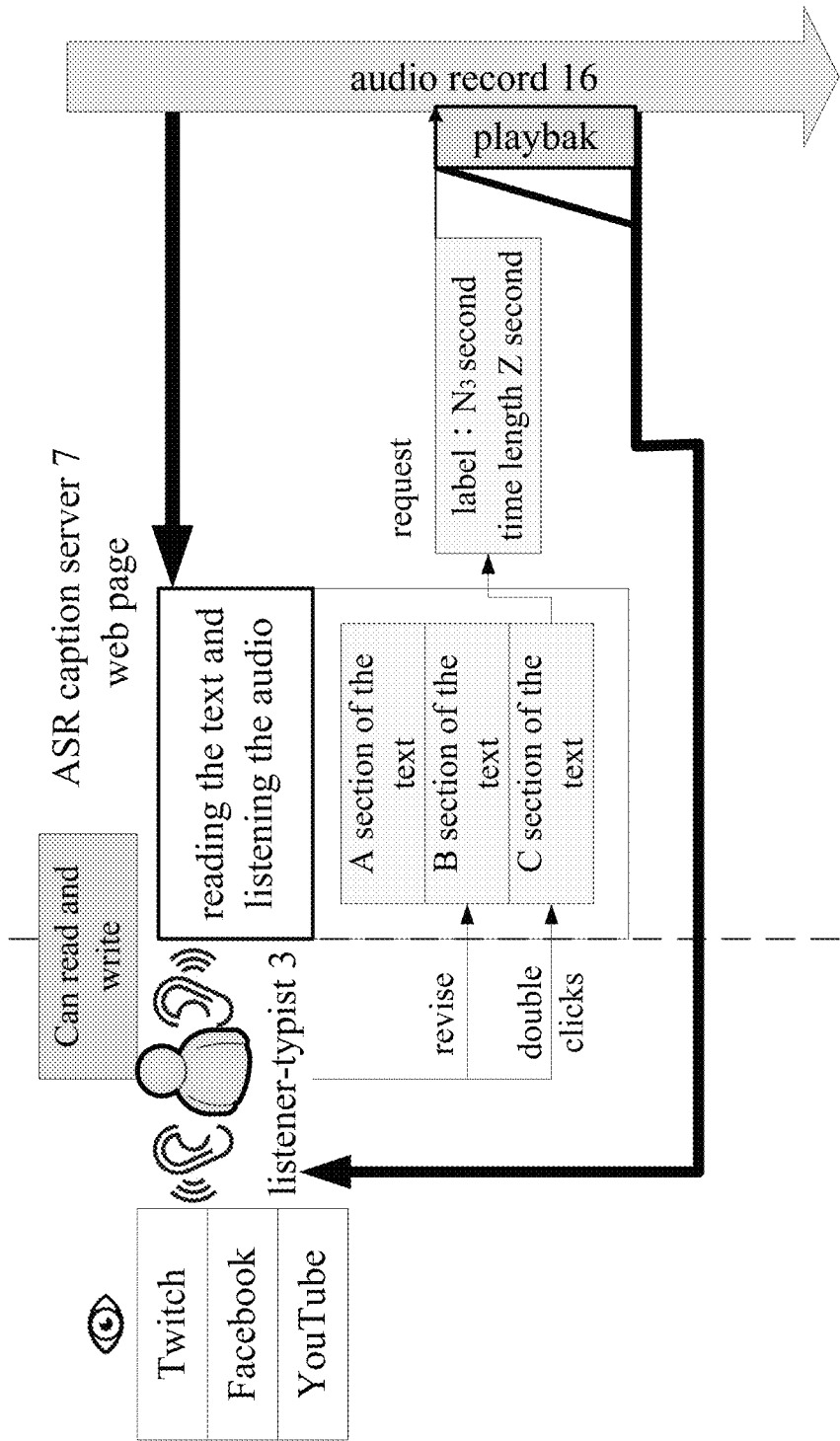
FIG. 5 shows schematically the operation of the listener-typist at D according to the present invention.

Referring to FIG. 5, the operation of the listener-typist 3 at B according to the present invention is described. The listener-typist 3 at B opens YouTube Facebook or Twitch platform to receive the live video and audio of the speaker 1 at A. The listener-typist 3 also logins in the web server 11 of the ASR caption server 7 through web browser for reading the text and listening the audio of the speaker 1.

The listener-typist 3 is set up to have the authority of reading and writing in the ASR caption server 7 so as to be capable to revise the text generated by the Kaldi ASR 10 in the web server 11. Each section of the text has a label, for example, if the listener-typist 3 clicks two times on the C section of the text, the web server 11 will follow the instructions of the related label to ask the audio record 16 to playback the paragraph of the $N_3$ second with time length Z seconds, so that the listener-typist 3 can recognize the contents spoken by the speaker 1 for amending the text.

Figure 6:
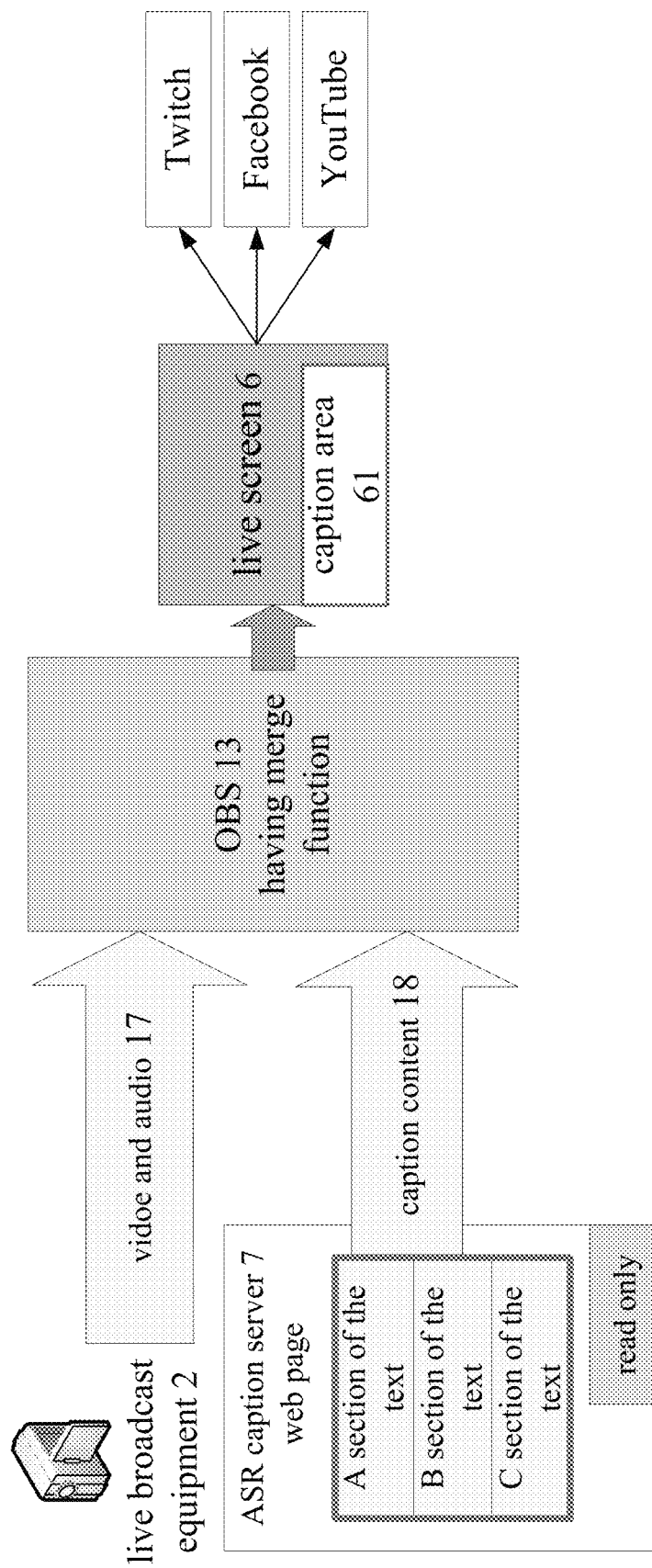
FIG. 6 shows schematically how to merge and output the live screen and the caption according to the present invention.

Referring to FIG. 6, the speaker 1 at A merges the live screen 6 with the caption to output according to the present invention is described. The live broadcast equipment 2 of the speaker 1 can login the web server 11 of the ASR caption server 7 through web browser, but has the authority of reading only, in other words, the live broadcast equipment 2 of the speaker 1 can only see the text generated by the ASR caption server 7 and the text revised by the listener-typist 3.

The OBS 13 is capable to merge pictures. The speaker 1 at the the live broadcast equipment 2 selects the caption content 18 from the web server 11 of the ASR caption server 7 and merges with the video and audio 17 from the live broadcast equipment 2 through the OBS 13 to output to the live screen 6 containing the caption generated by the ASR caption server 7, and then inputs to YouTube, Facebook or Twitch platform by the OBS 13, so that the hearing impaired 5 at C can see the caption content 18 from the caption area 61 on the live screen 6.

The scope of the present invention depends upon the following claims, and is not limited by the above embodiments.

What is claimed is:

1. A caption service system for remote speech recognition, comprising:
a speaker and a live broadcast equipment at A, a listener-typist and a computer at B, a hearing impaired and a live screen at C, an automatic speech recognition (ASR) caption server at D, the caption service system connects the live broadcast equipment, the computer, the live screen and the ASR caption server with a network, wherein A, B, C are remote locations from each other;
an audio of the speaker is sent to the ASR caption server to be converted into a text caption, the text caption is corrected by the listener-typist, and then the text caption is sent to the live screen of the hearing impaired together with the speaker's video and audio, so that the hearing impaired can see the text caption spoken by the speaker;
wherein the ASR caption server comprising: a real time messaging protocol (RTMP) to receive a live stream from A through the network; an open source speech recognition toolkit for conducting speech recognition and signal processing; a web server is responsible for providing a web page for being transmitted to the live broadcast equipment, the computer and the live screen through an HTTP protocol; and a recording module is used for a playback function of the listener-typist.

2. The caption service system for remote speech recognition according to claim 1, wherein the live broadcast equipment records an video and an audio of the speaker for splitting into two paths:
a first path including the video and audio of the speaker is inputted into an Open Broadcaster Software (OBS), an output of the OBS inputs the video and audio of the speaker into various platforms such as YouTube, Facebook or Twitch, etc.;
a second path including only the audio of the speakser is inputted into an ASR uploading interface for packeting the audio into a streaming packet, and then passing through the RTMP for inputting to the ASR caption server.

3. The caption service system for remote speech recognition according to claim 2, wherein the caption generating process of the ASR caption server comprising steps as below:
when the streaming packet is inputted into the RTMP of the ASR caption server, the streaming packet will be de-packeted to an audio streaming, and inputted into the open source speech recognition toolkit and the recording module respectively;
the recording module records the audio streaming into an audio record based on the time;
after the open source speech recognition toolkit receives the audio streaming, the audio streaming will be converted into a text, each section of the text will be added with a label, the label will describe what second of the audio record that the section of the text is corresponding to, and how long it is; the text and label thereof will be shown on a web page of the web server for being sent to the live broadcast equipment, the computer and the live screen through the network.

4. The caption service system for remote speech recognition according to claim 3, wherein the listener-typist opens YouTube, Facebook or Twitch platform to receive the video and audio of the speaker; the listener-typist also logins in the web server of the ASR caption server through a web browser for reading the text and listening the audio of the speaker; the listener-typist is set up to have the authority of reading and writing in the ASR caption server so as to be capable to revise the text generated by the open source speech recognition toolkit in the web server.

5. The caption service system for remote speech recognition according to claim 4, wherein the speaker from the live broadcast equipment logins the web server of the ASR caption server through the web browser, reads the text caption; then the speaker outputs the live screen with the text caption to the OBS for merging to output to YouTube, Facebook or Twitch platform, so that the hearing impaired can see the text caption from the caption area on the live screen.

6. The caption service system for remote speech recognition according to claim 1, wherein the network is a local area network or an Internet.

7. The caption service system for remote speech recognition according to claim 1, wherein the RTMP can be replaced by the HTTP Live Streaming (HLS), or can be replaced by any network transmission protocol having similar functions.

8. The caption service system for remote speech recognition according to claim 1, wherein the open source speech recognition toolkit is Kaldi ASR, which can be obtained freely under Apache License v2.0.

9. The caption service system for remote speech recognition according to claim 1, wherein If A, B, C are at a same place, then the speaker, the listener-typist and the hearing impaired are at a same classroom or a conference room.

\* \* \* \* \*